United States Patent
Ulrich

[15] 3,684,808
[45] Aug. 15, 1972

[54] ANTHRAQUINONYL TRIAZINE DYES

[72] Inventor: Paul Ulrich, Magnolienpark 10, Basel, Switzerland

[22] Filed: Jan. 27, 1970

[21] Appl. No.: 6,288

[30] Foreign Application Priority Data

Jan. 31, 1969   Switzerland...............1563/69

[52] U.S. Cl......260/249, 260/256.4 R, 260/256.4 Q, 260/262, 260/153, 8/34
[51] Int. Cl...........................................C07d 55/20
[58] Field of Search......................................260/249

[56] References Cited

UNITED STATES PATENTS 3,384,638   5/1968   Mix..........................260/249

*Primary Examiner*—John M. Ford
*Attorney*—Harry Goldsmith, Joseph G. Kolodny and Mario A. Monaco

[57] ABSTRACT

The invention relates to compounds of the formula (1)

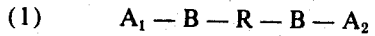

wherein $A_1$ and $A_2$ each denotes a residue of a polycyclic auinone, of which one must be vattable, B denotes a five-membered or six-membered heterocyclic ring which contains at least one ring nitrogen atom, and R denotes the residue of a polyfunctional hydroxy or mercapto compound which is bound through two of its oxygen or sulphur atoms to a carbon atom of the residue B.

9 Claims, No Drawings

ANTHRAQUINONYL TRIAZINE DYES

The present application provides new compounds of the general formula (1)    $-A_1-B-R-B-A_2$, wherein $A_1$ and $A_2$ each denotes a residue of a polycyclic quinone, of which at least one must be vattable, B denotes a five-membered or six-membered heterocyclic ring which contains at least one ring nitrogen atom, and R denotes the residue of a polyfunctional hydroxyl or mercapto compound which is bound through two of its oxygen or sulphur atoms to a carbon atom of the residue B.

The residues $A_1$ and $A_2$ can be identical or different and preferably represent anthraquinone residues.

The residue R can, for example, be a carbocyclic or heterocyclic residue which is bound through two of its oxygen or sulphur atoms to B. However, it also comprises mixed groups, for example an araliphatic or aliphatic-heterocyclic group and the like. Preferably, however, R represents an aromatic residue of the benzene or naphthalene series or a five-membered or six-membered heterocyclic residue having 1 to 3 hetero-atoms.

The heterocyclic residues B can contain further substituents for example alkyl or aryl groups, amino groups, for example alkylamino groups, arylamino groups or a free $H_2N-$ group, alkoxy groups, and etherified hydroxyl or mercapto groups, for example alkylmercapto groups or arylmercapto groups. In particular, B may also contain a second residue of a polycyclic quinone which is identical to that bound to B according to Formula (1).

Preferably, B is the residue of a heterocyclic compound of the general formula (2)

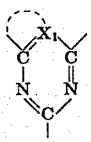

wherein $X_1$ denotes the group

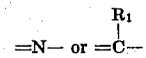

in which $R_1$ denotes a hydrogen atom or a substituent for example a halogen atom, or a nitro, cyano, —COCl— or alkyl group, for example a methyl group, or of the general formula (3)

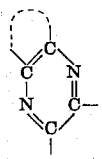

wherein the residues of formulas (2) and (3) can contain a fused carbocyclic ring as indicated by the broken line.

The manufacture of the compounds according to the invention can be carried out by reacting heterocyclic compounds having a five-membered or six-membered ring which contains at least 1 and preferably 2 or 3 ring nitrogen atoms, and which contains at least 2 easily removable substituents, for example methanesulphonyl groups or halogen atoms, with polyfunctional hydroxyl or mercapto compounds and polycyclic quinones which contain condensable groups.

Suitable heterocyclic compounds having a five-membered or six-membered ring which contains at least 1 and preferably 2 or 3 ring nitrogen atoms, and which contains at least two easily removable substituents, are above all compounds of the general formulas (4)

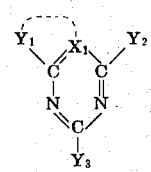

and (5)

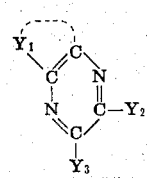

wherein $X_1$ has the above mentioned significance, and $Y_1$, $Y_2$ and $Y_3$ each denotes a hydrogen atom or a substituent, for example a low molecular alkyl group, a phenyl, naphthyl, phenylazo, alkoxy, aryloxy, arylamino or arylmercapto group, but wherein two of the substituents $Y_1$, $Y_2$ and $Y_3$ each denotes an easily removable substituent (for example a methanesulphonyl, benzenesulphonyl or $SO_3H$ group, an etherified mercapto group, or an $R_1-CS-S-$ group ($R_1$ = amino or alkyl), and also a sulphinic acid grouping or an ammonium or hydrazinium grouping, but above all a halogen atom, for example a chlorine or bromine atom). The heterocyclic rings of formulas (4) and (5) can also contain a fused carbocyclic ring as indicated by the broken line.

As heterocyclic compounds which are suitable for the present process there may be mentioned: halogen derivatives of thiazoles, especially benzthiazole, oxazoles, imidazoles and benzimidazoles, chloro-red acid chloride, 2,4-dichloro pyrimidine, 3,6-dichloropyridazine, 3,6-dichloropyridazine-5-carboxylic acid chloride, tetrachloropyridazine, 4,5-dichloropyridazon-(6)-yl-propionic acid chloride, 4,5-dichloro-1-phenylpyridazone-carboxylic acid chloride or -sulphonic acid chloride, 4,5-dichloropyridazone-propionic acid chloride, 1,4-dichlorophthalazine-carboxylic acid chloride or -sulphonic acid chloride, 2,3-dichloroquinoxaline-carboxylic acid chloride or -sulphonic acid chloride, 2,4-dichloroquinazoline-carboxylic acid chloride or -sulphonic acid chloride, 2,4,6-trichloropyrimidine or 2,4,6-tribromopyrimidine and their derivatives which for example carry a cyano, nitro, methyl, ethyl, carbamide, sulphamide, carbomethoxy, carbalkoxy, acyl (for example benzoyl, acetyl or propionyl), alkenyl (for example allyl or chlorovinyl) or a substituted alkyl (for example carboxymethyl, chloromethyl or bromomethyl) group in the 5-position, 2,4,5,6-tetrachloropyrimidine or 2,4,5,6-tetrabromopyrimidine, 2,6-dichloro- or 2,6-dibromo-4-carboethoxypyrimidine, 2,4,5-trichloropyrimidine, 5-nitro-6-methyl-2,4-dichloropyrimidine, 2,4-dichloropyrimidine-6-carboxylic acid chloride, 2,4-dichloropyrimidine-5-carboxylic acid chloride, 2,6-dichloropyrimidine- or 2,6-dibromopyrimidine-4- or -

5-carboxylic acid amides or -sulphonic acid amides or -4- or -5-carboxylic acid chloride or -sulphonic acid chloride, 2,4-dichloropyrimidine-5-sulphonic acid, 2,4-dichloro-5-chloromethyl-6-methylpyrimidine, 2,4-dibromo-5-bromomethyl-6-methylpyrimidine, 2,4-dichloro-5-chloromethylpyrimidine, 2,4-dibromo-5-bromomethylpyrimidine, 2,5,6-trichloro-4-methylpyrimidine, 2,6-dichloro-4-trichloromethylpyrimidine or especially 2-methanesulphonyl-4,5-dichloro-6-methylpyrimidine, 2,4-dimethanesulphonyl-5-chloro-6-methylpyrimidine, 2,4,6-trichloro-1,3,5-triazine or 2,4,6-tribromo-1,3,5-triazine, 4,6-dichloro-1,3,5-triazines which are substituted in the 2- position by an aryl or alkyl residue, for example a phenyl, methyl or ethyl residue, or by the residue of an aliphatic or aromatic mercapto compound bound through the sulphur atom or hydroxyl compound bound through the oxygen atom, or especially by a —NH$_2$ group or by the residue of an aliphatic, hetero-aliphatic or aromatic amino compound bound through the nitrogen atom. As such compounds, the residues of which can be bound to the triazine nucleus in the 2-position by reaction with trihalogenotriazines, the following may for example be mentioned: aliphatic or aromatic mercapto or hydroxyl compounds, for example thioalcohols, thioglycollic acid, thiourea, thiophenols, methyl alcohol, ethyl alcohol, isopropyl alcohol, glycollic acid, phenol, chlorophenols or nitrophenols, phenol carboxylic acids and phenol sulphonic acids, naphthols, naphthol sulphonic acids and the like, but especially ammonia and compounds containing an amino group which can be acylated, for example hydroxylamine, hydrazine, phenylhydrazine, phenylhydrazine sulphonic acids, carbamic acid and its derivatives, semi- and thiosemi-carbazides and -carbazones, methylamine, ethylamine, isopropylamine, methoxyethylamine, methoxypropylamine, dimethylamine, diethylamine, methylphenylamine, ethylphenylamine, chloroethylamine, ethanolamine, propanolamine, benzylamine, cyclohexylamine, morpholine, piperidine, piperazine, aminocarbonic acid esters, aminoacetic acid ethyl ester, aminoethane sulphonic acid, N-methylaminoethane sulphonic acid, but above all aromatic amines, for example aniline, N-methylaniline, toluidines, xylidenes, chloroanilines, p- and m-aminoacetanilide, nitroanilines, aminophenols, nitrotoluidines, phenylenediamines, toluylenediamines, anisidine, phenetidine, diphenylamine, naphthylamines, aminonaphthols and diaminonaphthalenes. Further, also colored compounds having dyestuff characteristics, for example 4-nitro-4'-aminostilbene disulphonic acid and aminoazo dyestuffs or aminoanthraquinones or phthalocyanines which still contain at least one reactive amino group.

Suitable polyfunctional hydroxyl or mercapto compounds which can be used for the manufacture of the compounds according to the invention are above all carbocyclic or heterocyclic compounds which contain at least two condensable —OH groups, cyclic compounds having a glucoside link, but especially aromatic or heterocyclic compounds which contain at least two hydroxyl groups having replaceable hydrogen atoms.

The following compounds may be mentioned: dihydroxybenzenes and trihydroxybenzenes, for example resorcinol, hydroquinone and their substitution products, phloroglucinol, pyrogallol and substitution products thereof, dihydroxydiphenyl derivatives, dihydroxynaphthalenes or naphthoquinones, for example 1,4-dihydroxynaphthalene or naphthazarine, dihydroxyanthracenes, for example rufol (1,5), chrysazole (1,8), dihydroxychrysene, dihydroxyanthraquinones and their substitution products, for example quinizarin (1,4), anthrarufin (1,5), chrysazin (1,8), purpurin (1,2,4-tri), flavopurpurin (1,2,6-tri), anthrapurpurin (1,2,7-tri), polyhydroxy compounds for example hexosene, cellobiose, cellulose, especially phlorin (phloroglucinol-mono-β-d-glucopyranoside), especially also polyhydroxyanthraquinones, 1,2,5,8-tetrahydroxyanthraquinone (= Alizarin Bordeaux), 1,2,4,5,6,8-hexahydroxyanthraquinone (= Anthracene Blue), dihydroxyindanthrone, dihydroxybenzanthrone, dihydroxy-iso-dibenzanthrone, dihydroxy-bi-phenyl-perylenetetracarboxylic acid diimide or for example compounds of the formulas

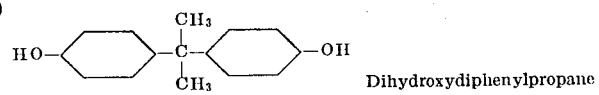
Dihydroxydiphenylpropane

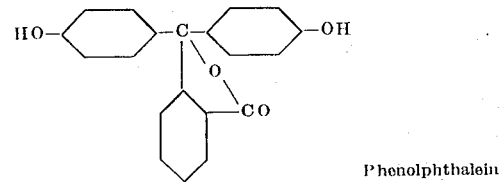
Phenolphthalein

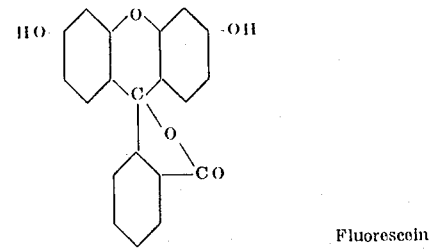
Fluorescein

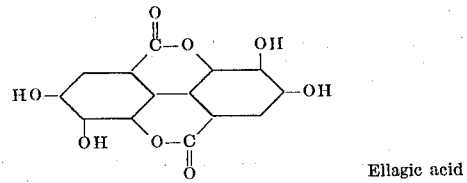
Ellagic acid or dihydroxyazo or polyazo dyestuffs, for example

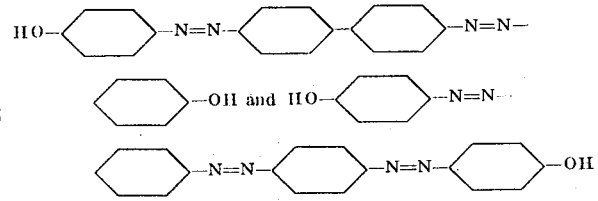

and their substitution products, 1,3-, 1,4- and 1,5-dihydroxynaphthalene, 2,6-dihydroxytoluene, di- or tri-hydroxy- or -mercapto-heterocyclics, for example 2-phenyl-4,6-dihydroxytriazine, 2,4,6-trihydroxypyrimidine, 2,4,6-trihydroxytriazine, 3,6-dihydroxypyridazine, 1,4-dihydroxyphthalazine, 1,3-dihydroxyquinazoline, 2,3-dihydroxyquinoxaline, 2,5-dimercapto-1,3,4-thiadiazole, 3,6-dihydroxy-1,2,4-trimethylbenzene, 4-methyluracil, di-β-naphthol, tetrahydroxybiphenyl and trihydroxybenzoic acid.

Instead of a dihydroxy or dimercapto compound, compounds which contain both a hydroxyl group and a mercapto group may also be used, for example, 2-mercapto-4-hydroxypyrimidine, 2-thiouracil or 4-methylthiouracil, so that compounds of Formula (1) are produced wherein R is on the one hand bound through an oxygen atom and on the other hand through a sulphur atom to the particular residue B.

Among the polycyclic quinones, those which are vattable are of particular importance. To manufacture the dyestuffs according to the invention, quinones containing condensable substituents, for example primary or secondary amino groups, may be reacted with the above mentioned compounds which contain easily removable substituents, for example halogen atoms, in known manner. The vattable quinones include those which contain chromophores which by reduction can be converted into a so-called leuco-form or vat, which possesses a better affinity for natural or regenerated cellulose fibers than the non-reduced form, and which can be converted back into the original chromophoric system by oxidation. Thus no polycyclic quinones of the type of 1- amino-4-arylaminoanthraquinone-2-sulphonic acid are used in the present process, because, whilst these can be reduced, they are chemically so greatly modified by the reduction that they can no longer be converted back into the original chromophoric system. As examples of vattable polycyclic quinones, the following may be mentioned: perylenetetracarboxylic acid imides, above all the phenylimides, anthrapyrimidines, anthrapyridones, isothiazolanthrones, quinazolinanthraquinones, oxazolanthraquinones, thiazolanthraquinones, oxdiazolanthraquinones, anthraquinonyl-triazoles, pyrazolanthraquinones, dipyrazolanthronyls, pyrazinoanthraquinones, azabenzanthrones, indanthrones, thioxanthonanthraquinones, anthrimides, anthrimidecarbazoles, dihydroacridines, anthanthrones, pyranthrones, dibenzpyrene-quinones, dibenzanthrones, isodibenzanthrones, flavanthrones, acedianthrones and especially anthraquinoneacridones and the anthraquinones themselves, whereby there are to be understood not only derivatives having pure 9,10-dioxoanthracene rings but also those with thiophanthrone residues and the like, as well as anthraquinone compounds which contain 9,10-dioxoanthracene rings which can carry the usual substituents, for example halogen atoms, alkoxy groups, alkyl groups, sulphonic acid amide groups, sulphone groups and acylamino groups as well as further fused and condensed-on carbocyclic and heterocyclic rings. As examples of suitable quinones which possess condensable amino groups, there may be mentioned: 1-amino-2-chloroanthraquinone, 1-amino-3-chloroanthraquinone, 2-amino-3-chloroanthraquinone, 1-amino-5-chloroanthraquinone, 2-amino-4-chloroanthraquinone, 1-amino-4-chloroanthraquinone, 1-amino-6-chloroanthraquinone, 1-amino-8l -chloroanthraquinone, 1-amino-3-chloro-6-methylanthraquinone, 1-amino-6,7-dichloroanthraquinone, 1-amino-4-benzoylaminoanthraquinone, 1-amino-4-methoxyanthraquinone, 2-amino-3,4-phthaloylacridone, 1,4-diamino-2-acetylaminoanthraquinone, aminoanthrapyrimidine, 1-aroylamino-4- or -5-aminoanthraquinones, 1,4-diamino-2-acetylanthraquinone, 1-amino-7-chloroanthraquinone, 1-amino-2-methyl-3-chloroanthraquinone, 4-aminoanthraquinone-2,1(N)-acridones, 4,4'-, 4,5'- or 5,5'-diamino-1,1'-dianthrimidecarbazole, aminopyranthrones, mono-and diaminoacedianthrone, aminoisodibenzanthrone, aminodibenzanthrone, aminoanthanthrone, aminoflavanthrone, aminopyranthrone, 4-, 5- or 8-amino-1,1'-dianthrimide-carbazole, 4- or 5-amino-5'-benzoylamino-dianthrimidecarbazole, 4-amino-4'-benzoylamino-dianthrimidecarbazole, aminodibenzpyrene-quinone, and also mono- and diaminotrianthrimidecarbazoles, for example 8',8''-diamino-1',1,4,1''-trianthrimidecarbazole, and also perylenetetracarboxylic acid di-(p- or m-aminophenyl)-amide, the compounds of the formulas

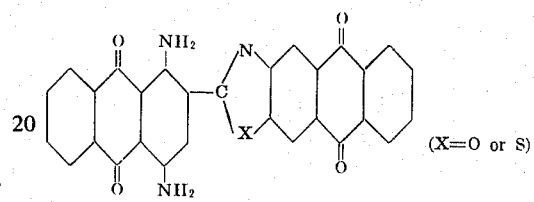 (X=O or S)

and

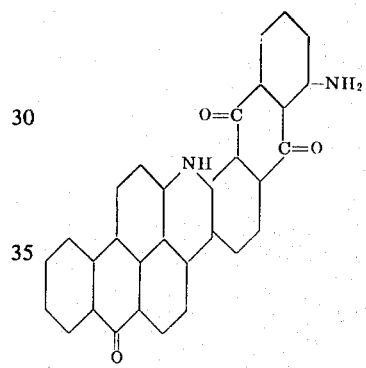

and those of the formula

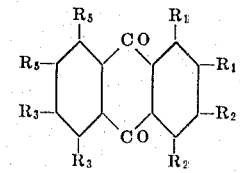

wherein one of the symbols $R_1$ represents a hydrogen atom and the other represents a grouping of the formula

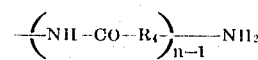

$n = 1$ or 2 one of the symbols $R_2$, $R_3$ and $R_5$ represents a halogen atom, an alkoxy, aryloxy, arylmercapto or acylamino group, especially a benzoylamino group, for example a chloro-, methyl-, sulpho-or fluoro-benzoylamino group or the unsubstituted $C_6H_5$—CO—group itself, and the other symbol $R_2$, $R_3$ or $R_5$ represents a hydrogen or halogen atom, one of the pairs of symbols $R_2R_2$, $R_3R_3$ or $R_5R_5$ together being able to represent a grouping

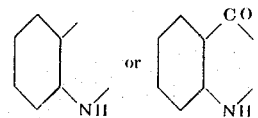

and $R_4$ denotes an arylene residue, preferably of the benzene series, the compound

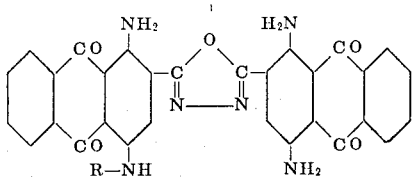

wherein R can be a benzoyl group or a hydrogen atom, aminoisothiazolanthrones and amino-indanthrones.

The condensation reactions may be advantageously carried out in an inert solvent and in the presence of an acid-binding agent, for example sodium carbonate, sodium acetate, or advantageously a tertiary amine, preferably pyridine.

The reaction of the heterocyclic compounds of formulas (4) and (5) or of the derivatives of the acids mentioned with the hydroxy or mercapto compounds and the polycyclic quinones can take place in any desired sequence. Advantageously, however, the reaction with the hydroxy or mercapto compounds corresponding to the residue R takes place last. Thus for example, 2 mols of a monohalogen compound of the formula

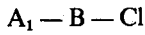

$$A_1 - B - Cl$$

may be condensed by heating with 1 mol of a dihydroxy compound in an organic medium, for example chlorobenzene, nitrobenzene, N-methylpyrrolidone, pyridine, quinoline and the like.

It can be of advantage to pass a stream of air or nitrogen through the reaction mixture periodically or for the entire duration of the reaction. Under certain circumstances it can also be advantageous to add acid-binding substances to the reaction mixture, for example alkalis (sodium carbonate, potassium carbonate and others) or such compounds which facilitate the acid splitting, for example tertiary bases (pyridine and others) or dimethylformamide and the like.

The compounds according to the invention are excellent vat dyestuffs and pigment dyestuffs. The dyestuffs can also contain sulphonic acid groups. Occasionally, products having better fiber affinity are obtained when compounds free from sulphonic acid groups are subsequently sulphonated according to one of the usual processes. The dyeings obtained with the compounds according to the invention are distinguished by vivid clear shades. Their advantageous application properties should be particularly emphasized. The present process yields inter alia dyestuffs which can be applied independently of the temperature. They can be applied according to the most diverse processes, for example the exhaustion process or according to the pad dyeing process, for example the pad-jig process, the pad-steam process or the cold dwell process. It is equally noteworthy that good dyestuff yields are achieved in all application processes. It is also noteworthy that a high proportion of the compounds can be synthesized in almost theoretical yield according to the invention. It is a particular advantage that the range of color shades is very great, so that using the compounds according to the invention practically all color shades can be produced. Dyestuffs can also be obtained inter alia which in comparison with the hydroxy compounds which have only been reacted on one side with a heterocyclic component possess more level dyeing properties, and also dyestuffs which reserve very well on polyester material.

The products obtained according to the process are suitable for dyeing and printing the most diverse materials, in particular for dyeing and printing fibers of natural and regenerated cellulose in the presence of reducing agents, for example dithionite. The dyeings obtained are distinguished by very good properties of wet fastness, especially fastness to boiling with soda and fastness to chlorine, and also by good to very good light fastness properties, and in many cases by a remarkably good behavior on "industrial laundering."

The new compounds can also be used as pigments. As a result of their advantageous properties they can be used for the most diverse pigment applications, for example in a finely divided form for the dyeing of acetate rayon and viscose or cellulose ethers or cellulose esters or polyamides or polyurethanes or polyesters in the spinning composition, and also for the manufacture of colored lacquers or lacquer-forming agents, solutions or products of acetylcellulose, nitrocellulose, natural resins or synthetic resins, for example polymerization resins or condensation resins, for example aminoplasts, alkyd resins, phenoplasts, polyolefines, for example polyethylene, polypropylene, polystyrene, polyvinyl chloride, and polyacrylonitrile, rubber, casein, silicone and silicone resins. They can furthermore advantageously be used in the manufacture of crayons, cosmetic preparations or laminated sheets. The compounds according to the invention also include, amongst others, pigment dyestuffs which are distinguished by their excellent migration behavior in fabrics coated with polyvinyl chloride.

In the Examples which follow the parts always denote parts by weight.

EXAMPLE 1

11.2 Parts of the reaction product of 1 mol of cyanuryl chloride and 2 mols of 1-aminoanthraquinone are heated to the boil in 100 parts of nitrobenzene together with 1.1 parts of hydroquinone with the addition of 0.3 part of pyridine, whilst passing a gentle stream of nitrogen through the mixture. The mixture is kept at the reaction temperature for 5½ hours whilst stirring, allowed to cool to about 100° C. and filtered hot, the product is washed with nitrobenzene and subsequently with methanol and dried in vacuo.

A yellow dyestuff of the constitution

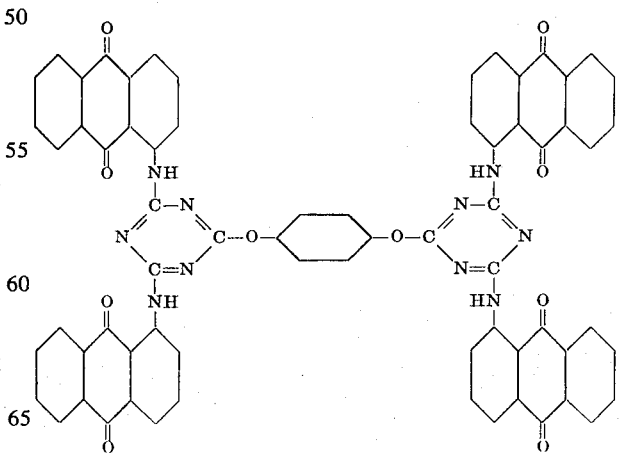

is obtained, which is taken up by cellulose-containing textiles using the customary vat dyeing processes to give clear yellow shades.

EXAMPLE 2

6.3 Parts of the reaction product of 1 mol of cyanuryl

The reaction charge is worked-up in accordance with Example 1.

The isolated dyestuff of the constitution

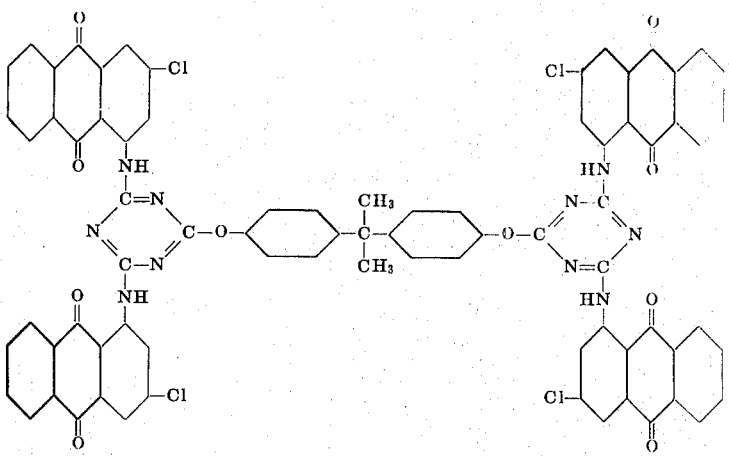

chloride and 2 mols of 1-amino-3-chloroanthraquinone are heated to the boil in 80 parts of nitrobenzene together with 1.2 parts of 4,4'-dihydroxydiphenylpropane with the addition of 0.3 part of pyridine. The mixture is stirred for 2 hours at the reaction temperature while periodically passing a gentle stream of nitrogen through the reaction vessel.

dyes cotton and regenerated cellulose fibers in accordance with the vat dyeing processes clear greenish-tinged yellow shades.

Using the starting substances mentioned in the Table which follows, further dyestuffs can be manufactured in the manner according to the invention, their color shades being given in the last column.

| | Reactive Component | Dihydroxy Compound | Colour Shade |
|---|---|---|---|
| 1. | (anthraquinone-NH-triazine-Cl-NH-anthraquinone structure) | HO-⌬-C(-O-CO-⌬)-⌬-OH | yellow |

| | Reactive Component | Dihydroxy Compound | Colour Shade |
|---|---|---|---|
| 2. | 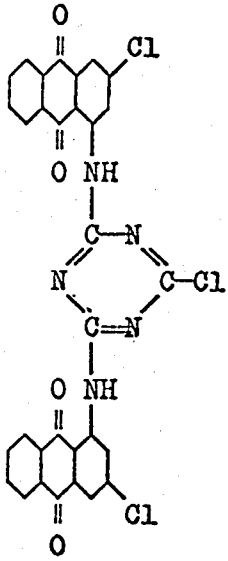 | 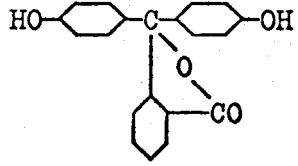 | greenish-tinged yellow |
| 3. | 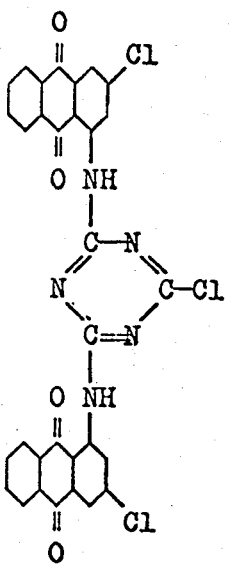 | 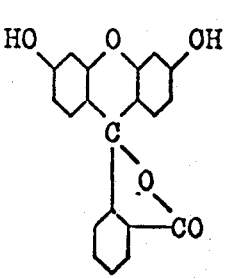 | greenish-tinged yellow |
| 4. | 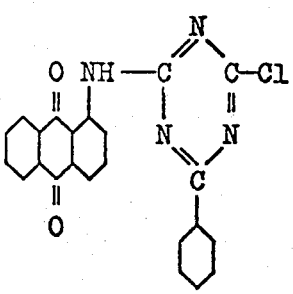 | 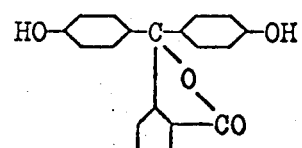 | yellow |

| | Reactive Component | Dihydroxy Compound | Colour Shade |
|---|---|---|---|
| 5. | 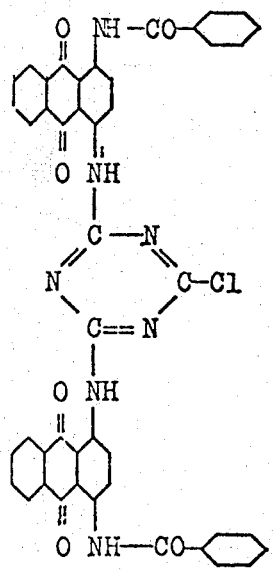 | " | red |
| 6. |  | 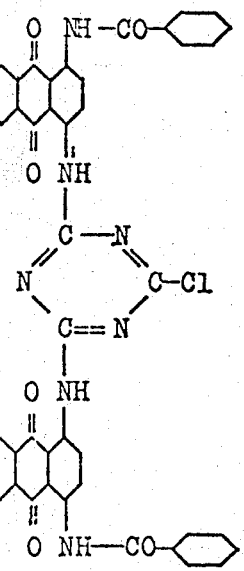 | blue |
| 7. |  | 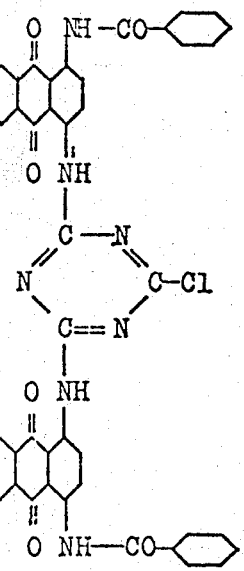 | yellow |

| | Reactive Component | Dihydroxy Compound | Colour Shade |
|---|---|---|---|
| 8. | 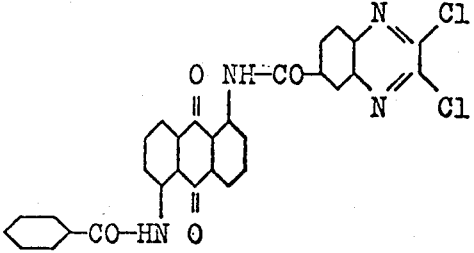 | 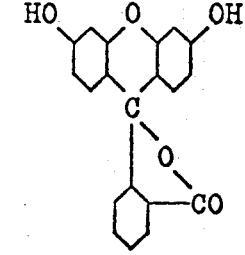 | yellow |
| 9. | 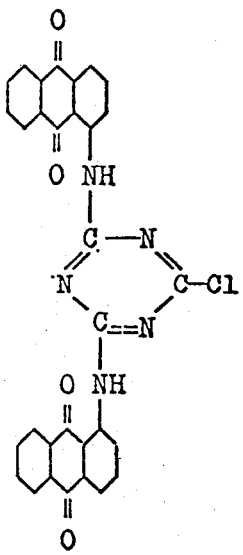 | 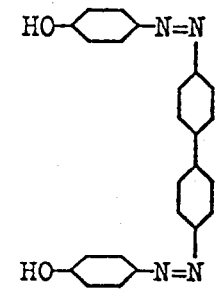 | yellow |
| 10. | 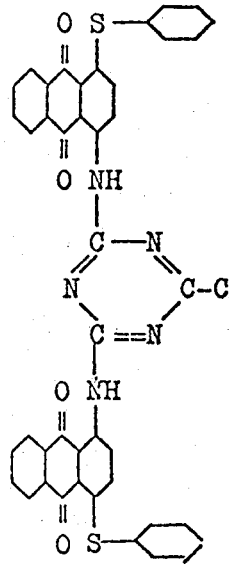 | 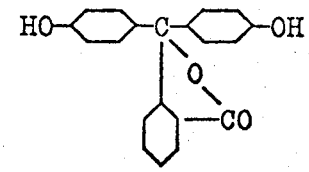 | red |

| | Reactive Component | Dihydroxy Compound | Colour Shade |
|---|---|---|---|
| 11. | 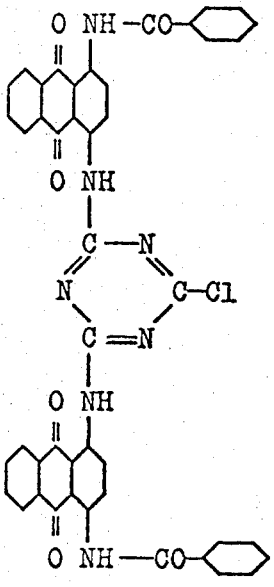 | 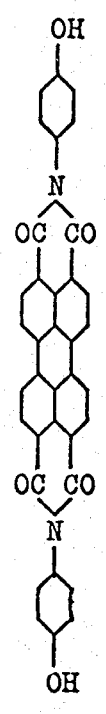 | red |
| 12. | 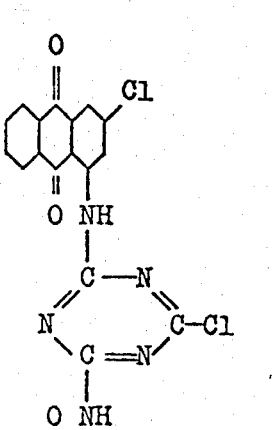 | 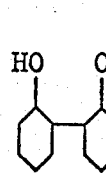 | greenish-tinged yellow |

| | Reactive Component | Di-, Tri- or Poly-hydroxy or -mercapto-Compound | Colour Shade |
|---|---|---|---|
| 13. | 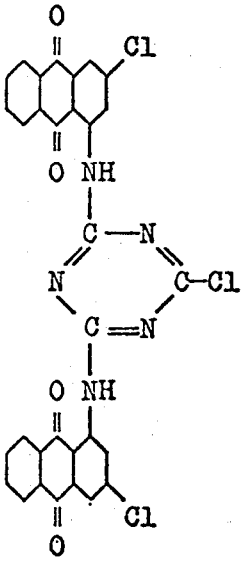 | 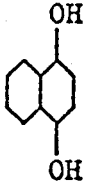 | yellow |
| 14. | 2 Mols " | 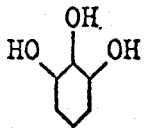 | " |
| 15. | 3 Mols " | 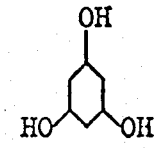 | " |
| 16. | 4 Mols " | 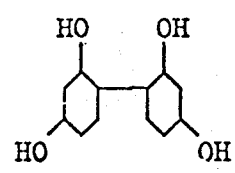 | " |

| | Reactive Component | Di-, Tri- or Poly-hydroxy or -mercapto Compound | Colour Shade |
|---|---|---|---|
| 17. | 2 Mols [structure] + 1 Mol [structure] | [structure: benzene-1,3,5-triol] | green |

| | Reactive Component | Di-, Tri- or Poly-hydroxy or -mercapto Compound | Colour Shade |
|---|---|---|---|
| 18. | 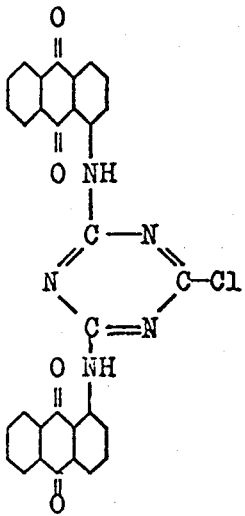 | 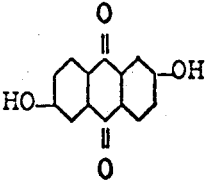 | yellow |
| 19. | 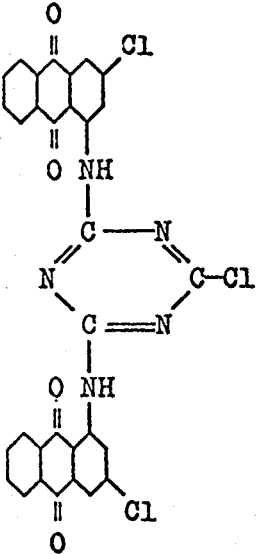 | 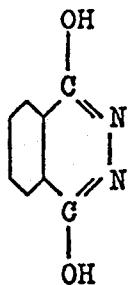 | " |

| | Reactive Component | Di-, Tri- or Polyhydroxy or -mercapto Compound | Colour Shade |
|---|---|---|---|
| 20. | 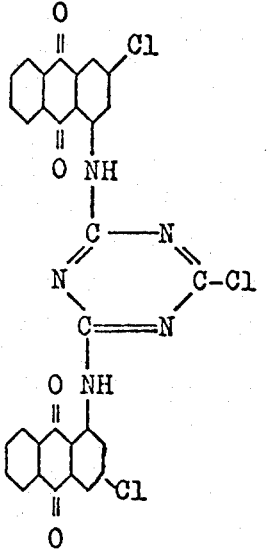 | 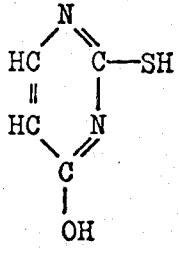 | yellow |
| 21. | " | 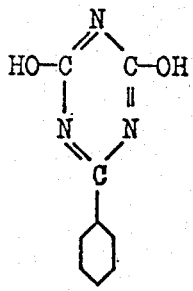 | yellow |
| 22. | " | 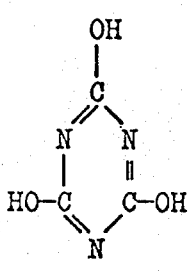 | yellow |

| | Reactive Component | Di-, Tri- or Polyhydroxy or -mercapto Compound | Colour Shade |
|---|---|---|---|
| 23 | 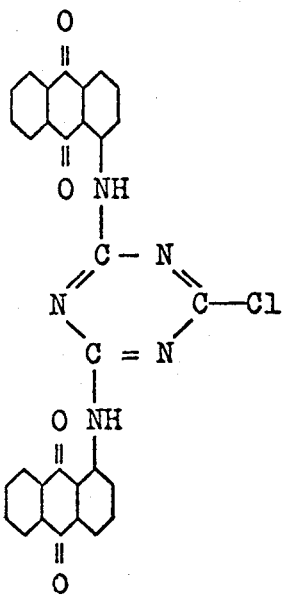 | 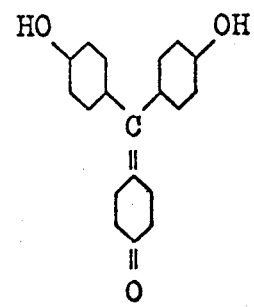 | yellow |
| 24 | " | 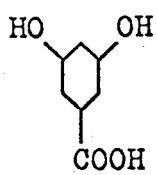 | yellow |
| 25 | " | 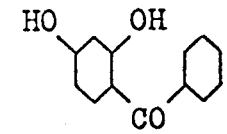 | yellow |
| 26 | " | 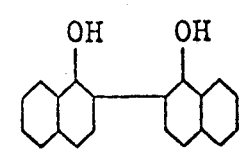 | yellow |

| | Reactive Component | Di-, Tri- or Polyhydroxy or -mercapto Compound | Colour Shade |
|---|---|---|---|
| 27 | 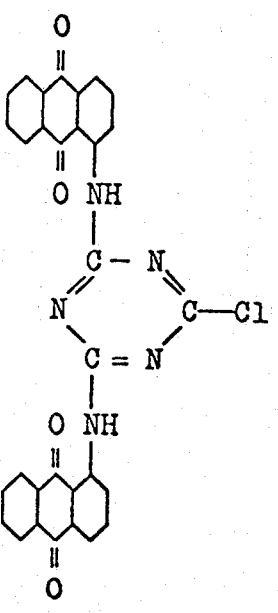 | 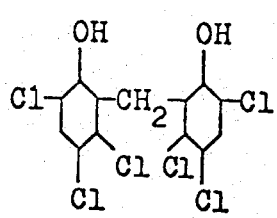 | yellow |
| 28 | " | 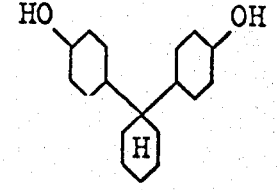 | yellow |
| 29 | " | 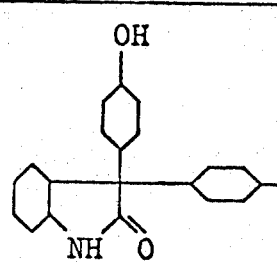 | yellow |

| | Reactive Component | Di-, Tri- or Polyhydroxy or -mercapto Compound | Colour Shade |
|---|---|---|---|
| 30 | 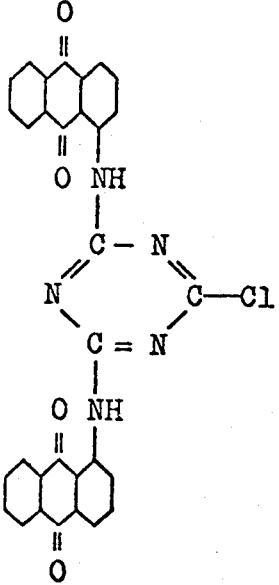 | 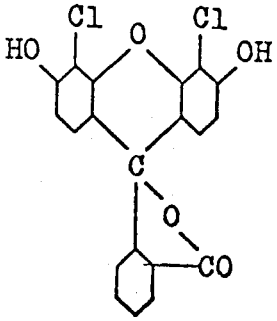 | yellow |
| 31 | " | 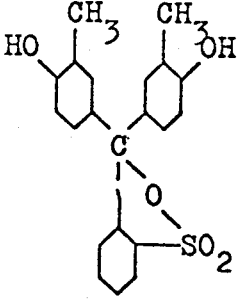 | yellow |
| 32 | " | 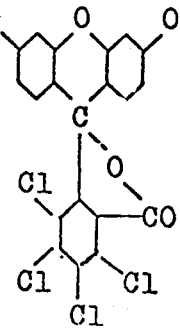 | yellow |

| | Reactive Component | Di- Tri- or Polyhydroxy or -mercapto Compound | Colour Shade |
|---|---|---|---|
| 33 | 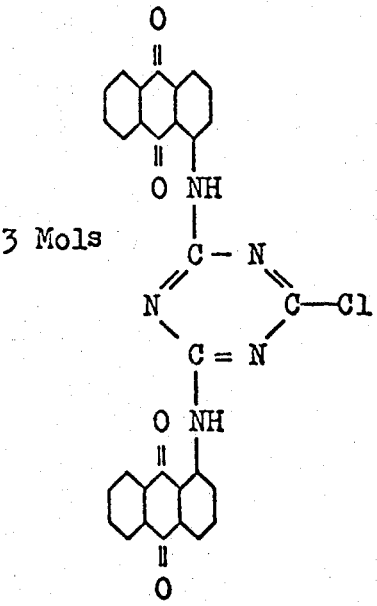 3 Mols | 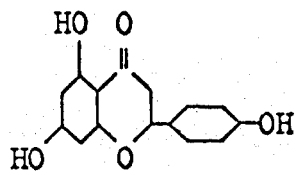 | yellow |
| 34 | 3 Mols " | 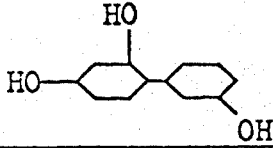 | yellow |
| 35 | 3 Mols " | 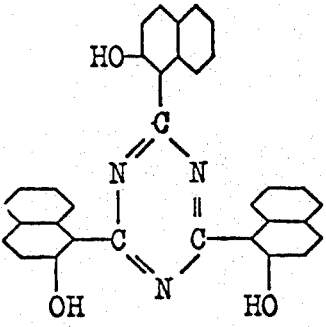 | yellow |

| | Reactive Component | Di-, Tri- or Polyhydroxy or -mercapto Compound | Colour Shade |
|---|---|---|---|
| 36 | 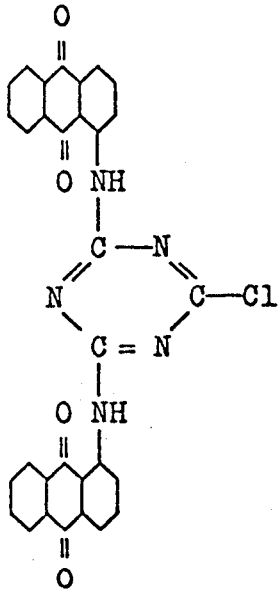 | 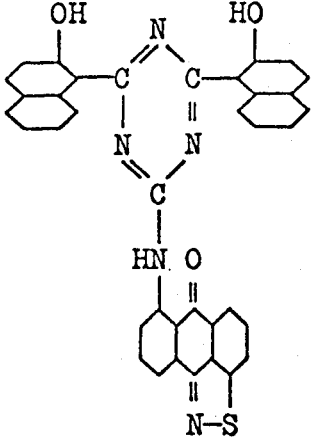 | yellow |
| 37 | " | 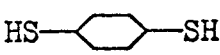 | yellow |
| 38 | " | 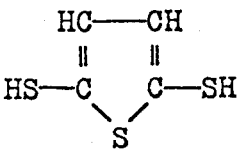 | yellow |
| 39 | 3 Mols " | 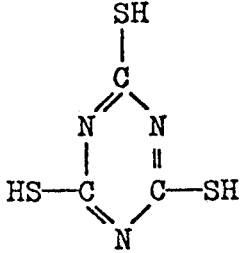 | yellow |

| | Reactive Component | Di-, Tri- or Polyhydroxy or -mercapto Compound | Colour Shade |
|---|---|---|---|
| 40 |  |  | greenish-tinged yellow |
| 41 |  |  | greenish-tinged yellow |
| 42 | " |  | greenish-tinged yellow |
| 43 | " |  | greenish-tinged yellow |

| | Reactive Component | Di-, Tri- or Polyhydroxy or -mercapto Compound | Colour Shade |
|---|---|---|---|
| 44 | 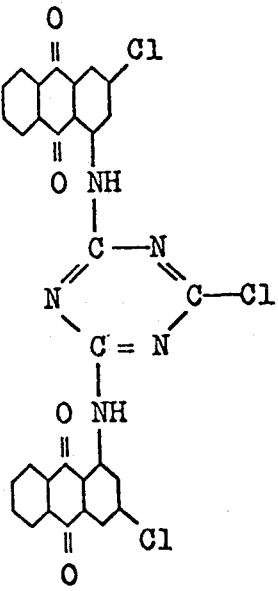 | 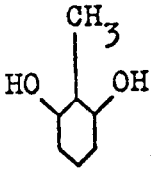 | greenish-tinged yellow |
| 45 | " |  | greenish-tinged yellow |
| 46 | " | 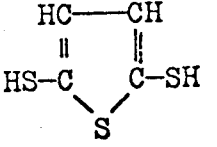 | greenish-tinged yellow |

| | Reactive Component | Di-, Tri- or Polyhydroxy or -mercapto Compound | Colour Shade |
|---|---|---|---|
| 47 | (anthraquinone-OCH₃ derivative linked via NH to triazine with Cl, bis-substituted) | resorcinol (1,3-dihydroxycyclohexane shown) | red-orange |
| 48 | " | 1,3-dimercaptocyclohexane (HS, SH) | red-orange |
| 49 | 3 Mols  " | 2,4,6-trimercapto-1,3,5-triazine | red-orange |

| | Reactive Component | Di-, Tri- or Polyhydroxy or -mercapto Compound | Colour Shade |
|---|---|---|---|
| 50 | 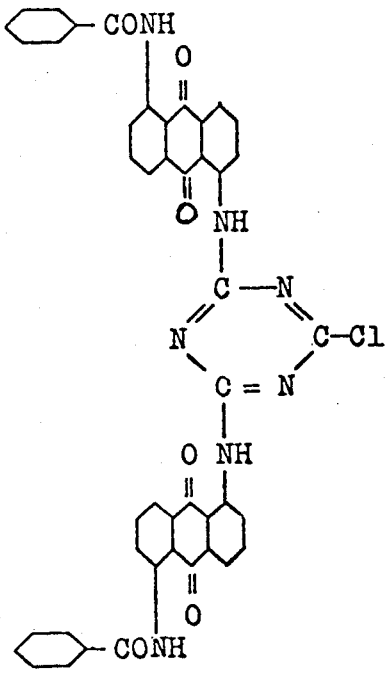 | 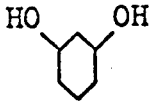 | golden-orange |
| 51 | " |  | " |
| 52 | " | 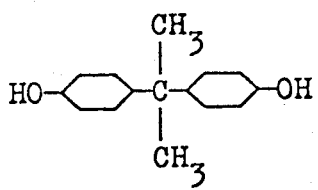 | " |
| 53 | " | 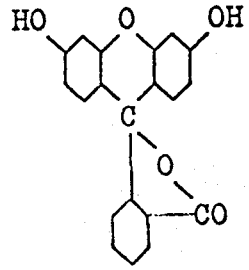 | " |

| | Reactive Component | Di-, Tri- or Polyhydroxy or -mercapto Compound | Colour Shade |
|---|---|---|---|
| 54 | 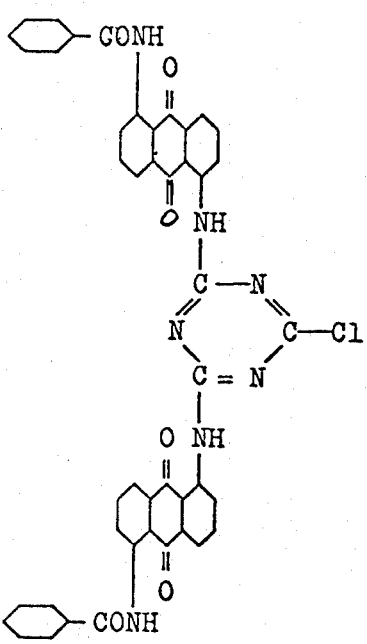 | 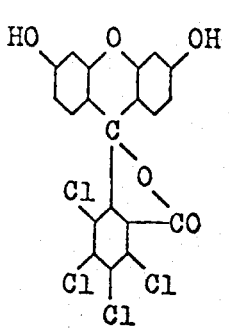 | golden-orange |
| 55 | " | 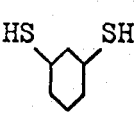 | " |
| 56 | " | 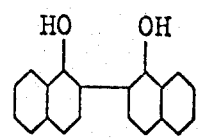 | " |

| Reactive Component | Di-, Tri- or Polyhydroxy or -mercapto Compound | Colour Shade |
|---|---|---|
| 57  |  | greenish-tinged yellow |
| 58 " |  | yellow |
| 59  |  | olive-green |

| | Reactive Component | Di-, Tri- or Polyhydroxy or -mercapto Compound | Colour Shade |
|---|---|---|---|
| 60 | 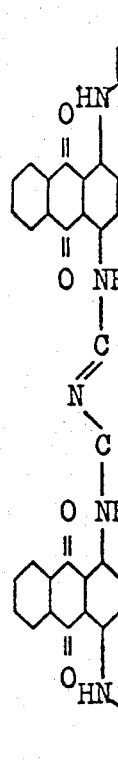 | 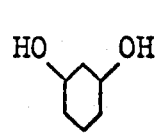 | blue |
| 61 | " | 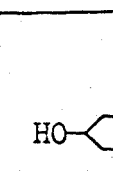 | blue |
| 62 | " |  | blue |

| | Reactive Component | Di-, Tri- or Polyhydroxy or -mercapto Compound | Colour Shade |
|---|---|---|---|
| 63 | 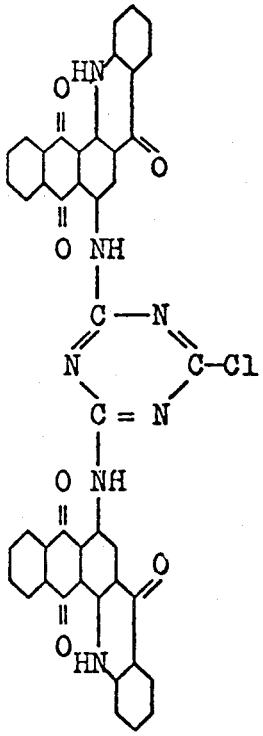 | 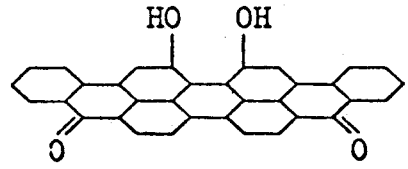 | blue |
| 64 | " | 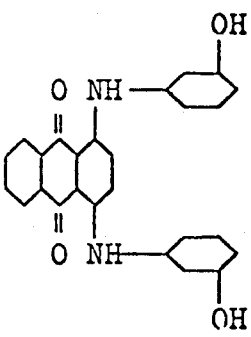 | blue |
| 65 | " | 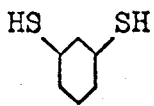 | blue |

| | Reactive Component | Di-, Tri- or Polyhydroxy or -mercapto Compound | Colour Shade |
|---|---|---|---|
| 66 | 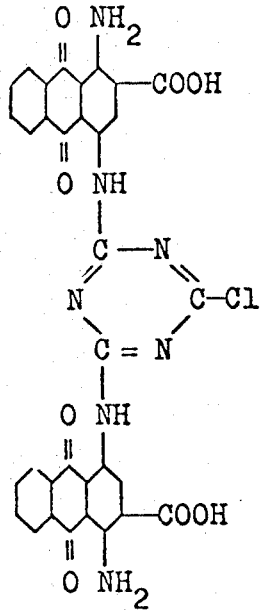 | 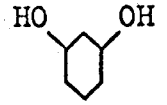 | blue |
| 67 | 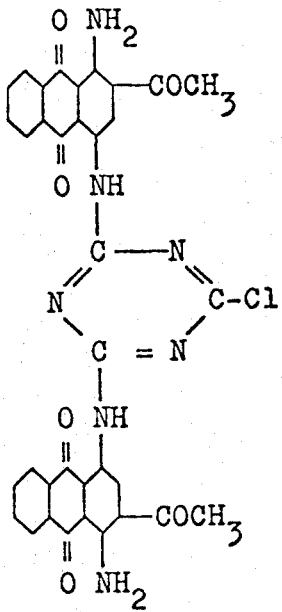 | 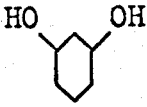 | blue |

| | Reactive Component | Di-, Tri- or Poly-hydroxy or -mercapto Compound | Colour Shade |
|---|---|---|---|
| 68 | | | blue |

EXAMPLE 3

4.1 Parts of the compound of the formula

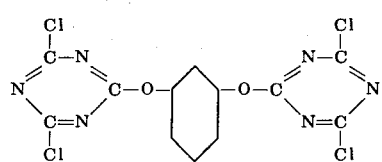

which is obtained by reacting resorcinol with 2 mols of cyanuryl chloride and 9.0 parts of 1-aminoanthraquinone, are heated in 100 parts of nitrobenzene in the presence of 0.3 part of pyridine to 155° to 160° C. for 6 hours while stirring. Simultaneously, a gentle stream of air or nitrogen is passed through the reaction mixture. Thereafter the mixture is heated to 205° to 210° C. and kept at this temperature until no further hydrochloric acid is evolved.

The mixture is allowed to cool to room temperature, filtered, and the product is washed with nitrobenzene and subsequently with methanol and dried in vacuo at 60° C. The resulting dyestuff of the formula

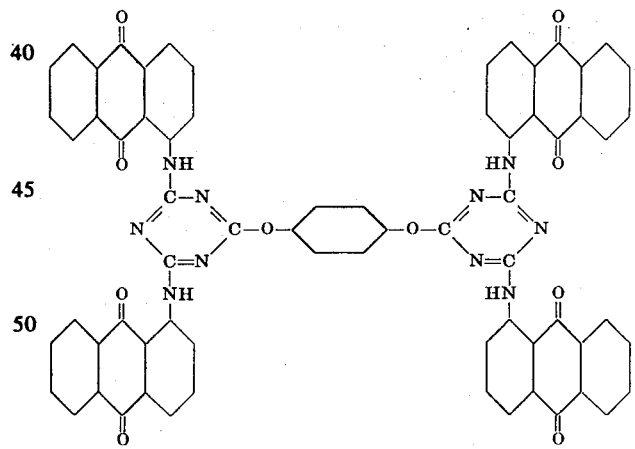

dyes cotton according to usual vat dyeing processes intense yellow shades.

When 2-aminoanthraquinone or 2-amino-4-chloroanthraquinone are used instead of 1-aminoanthraquinone, dyestuffs with similar properties are obtained.

EXAMPLE 4

6.2 Parts of the compound of the formula

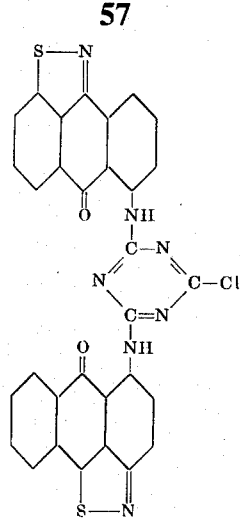

in 70 parts of nitrobenzene together with 1.15 parts of 4,4'-dihydroxydiphenylpropane and 0.3 part of pyridine, are heated to the boil for 3 hours whilst stirring. The mixture is then allowed to cool to 80° C, filtered, and the product washed with warm nitrobenzene and subsequently with methanol. The resulting dyestuff of the formula

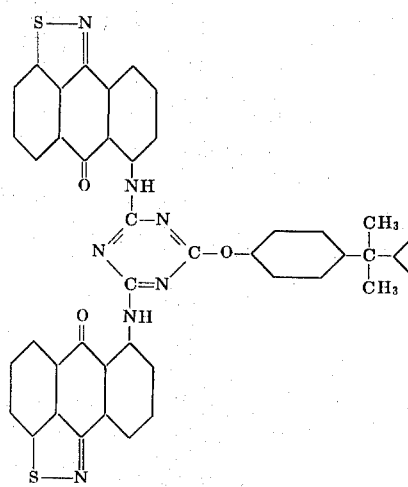

dyes polyvinyl chloride yellow shades of excellent migration fastness and light fastness properties.

When instead of the above mentioned dihydroxy compound, 0.55 part of resorcinol is used, a dyestuff of similar good fastness properties is obtained.

EXAMPLE 5

3.15 Parts of the compound of the formula

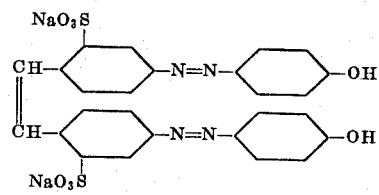

in 60 parts of dimethylformamide are heated for 24 hours to 150° to 153° C. with 5.6 parts of the reaction product of 1 mol of cyanuryl chloride and 2 mols of 1-aminoanthraquinone in the presence of 0.55 part of calcined sodium carbonate. Working-up takes place in accordance with the data of Example 1. The isolated dyestuff of the formula

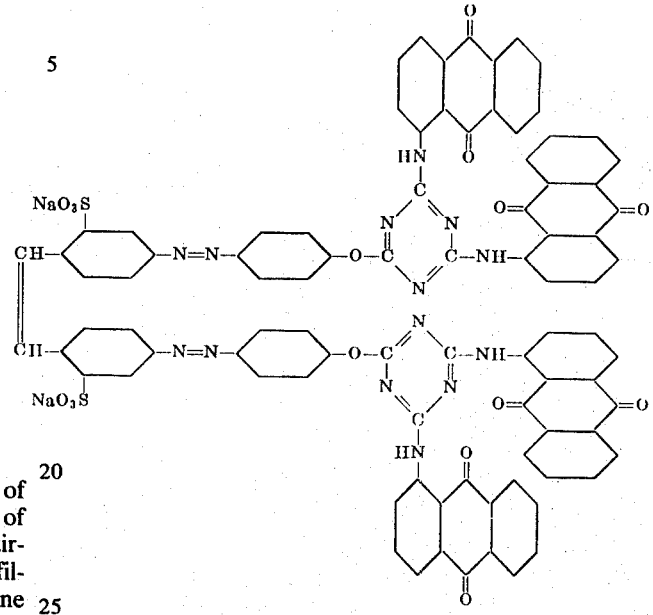

dyes cotton according to usual vat dyeing processes intense yellow shades.

DYEING INSTRUCTION

1 Part of dyestuff is reduced with 10 parts by volume of sodium hydroxide solution of 36° Be and 5 parts of sodium hydrosulphite in 200 parts of water at 50° to 70° C. The above stock vat is added to a dyebath containing 5 parts by volume os sodium hydroxide solution of 36° Be and 3.7 parts of sodium hydrosulphite in 2,000 parts of water, and 100 parts of cotton are introduced at 40° C. After 10 minutes, 15 parts of sodium chloride are added, followed by a further 15 parts after 20 minutes, and dyeing is carried out at 40° C. for 45 minutes. Thereafter the cotton is squeezed, oxidized and finished in the usual manner.

PIGMENT DYEING

5 Parts of the dyestuff mentioned in Example 2 are mixed with 95 parts of dioctyl phthalate and ground in a ball mill until the dyestuff particles are smaller than 3μ.

0.8 Part of this dioctyl phthalate paste is mixed with 13 parts of polyvinyl chloride, 7 parts of dioctyl phthalate and 0.1 part of cadmium stearate and thereafter milled for 5 minutes at 140° C. on a two-roll mill.

A material which is dyed a greenish-tinged yellow and has good migration properties and good light fastness is obtained.

When instead of the above mentioned dyestuff, the dyestuff of Example 9 is used and in other respects the same procedure is followed, a material dyed red shades and having good migration fastness properties and light fastness properties is obtained.

When instead of the above mentioned product the dyestuffs of Examples 3, 6, 12, 44, 52 or 53 in the table are used, and in other respects the same procedure is followed, dyed materials having similar good migration fastness properties and light fastness properties are obtained.

LACQUER DYEING

40 Parts of a nitrocellulose lacquer, 2.375 parts of titanium dioxide and 0.125 part of the dyestuff No. 52

are ground for 16 hours in a rod mill. The resulting lacquer is coated as a thin layer on an aluminum foil. It yields a golden orange coloring of excellent light fastness.

Lacquer dyeings having similar good light fastness properties are obtained by using the dyestuffs according to Examples 6, 12, 44 or 53 in the Table.

I claim:
1. A compound of the formula

$$(A-NH)_n-B-R-B-(-NH-A)_n$$

in which A is anthraquinonyl optionally substituted by chloro,
  amino, carboxyl, acetyl, acetylamino, methyl, methoxy,
  benzoylamino or mercaptophenyl,
  or phthaloylacridonyl,
  $n$ is 1 or 2
B is S-triazinyl which, when $n=1$, additionally contains a phenyl substituent
R is the residue of
  dihydroxydiphenylpropane, dihydroxydiphenylmethane, phenolphthalein, fluorescein, chlorinated fluorescein dimercaptobenzene, hydroquinone, 2,3-dicyanohydroquinone, dihydroxybiphenyl, tetrahydroxybiphenyl, dihydroxynaphthalene, di-β-naphthol, pyrogallol, phloroglucinol, rescorcinol, methylresorcinol, benzoylresorcinol, carboxyresorcinol, 4,4'-dihydroxy-diphenyl (1,4-cyclohexadienone) methylidene or 1,1-di(p-hydrocyphenyl) cyclohexane.

2. A compound according to claim 1 of the formula

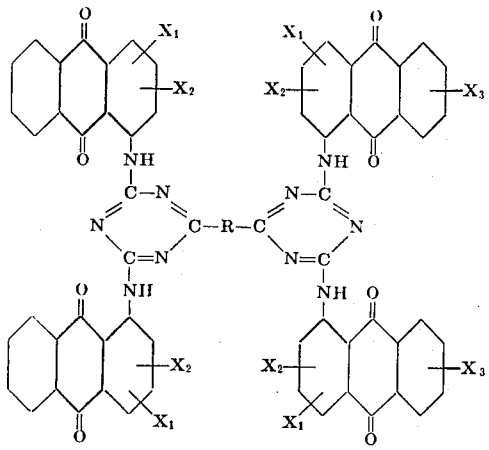

X₁ is hydrogen, chlorine, benzoylamino, phenylmercapto, carboxy, methoxy or acetyl,
X₂ is hydrogen or amino,
X₃ is hydrogen or benzoylamino.

3. A dyestuff as claimed in claim 1 of the formula

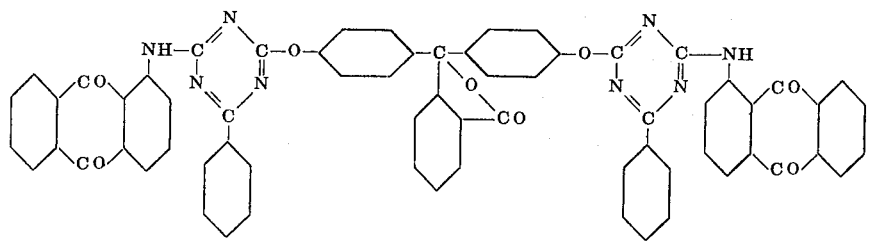

4. A dyestuff as claimed in claim 1 of the formula

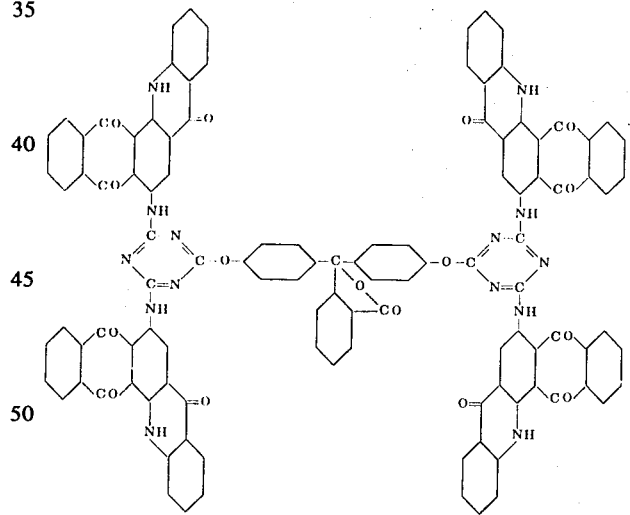

5. A compound of the formula:

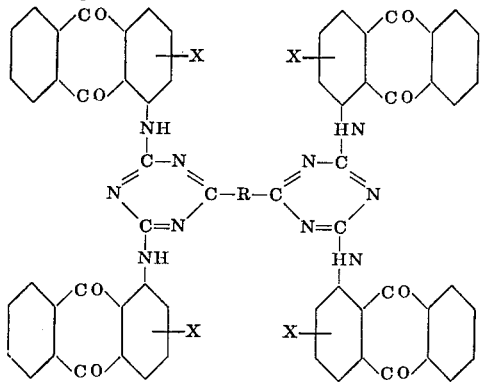

wherein X is hydrogen, chlorine or phenylmercapto, R is
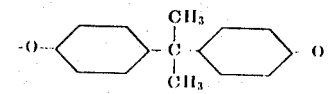
or
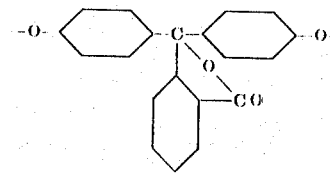
6. A compound as claimed in claim 5, wherein X denotes a chlorine atom bound in the 3-position.
7. A dyestuff as claimed in claim 5 of the formula
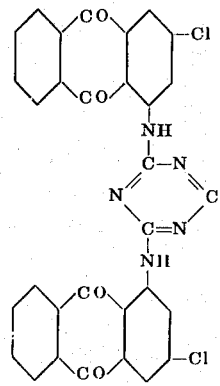 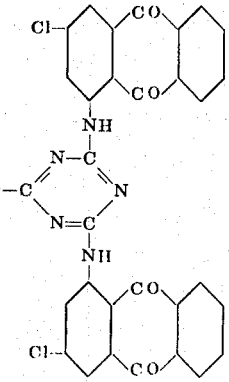
8. A dyestuff as claimed in claim 5 of the formula
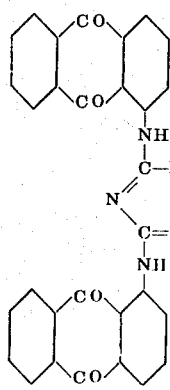 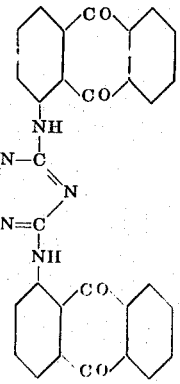
9. A dyestuff as claimed in claim 5 of the formula
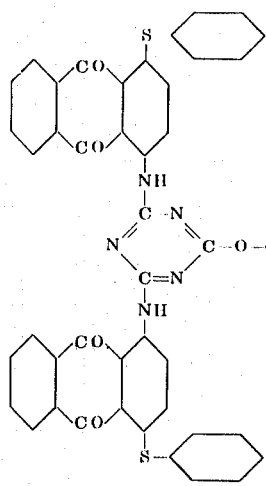 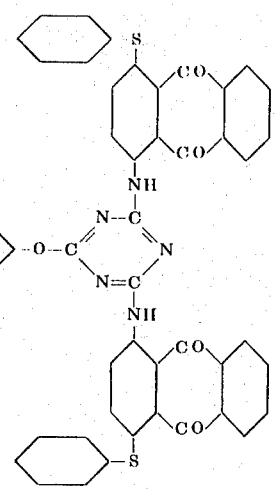
* * * * *

PO-1050
(5/69)

UNITED STATES PATENT OFFICE
CERTIFICATE OF CORRECTION

Patent No. 3,684,808            Dated  August 15, 1972

Inventor(s)  PAUL ULRICH

It is certified that error appears in the above-identified patent and that said Letters Patent are hereby corrected as shown below:

Cover page, insert

-- [73] Assignee: CIBA-GEIGY AG, Basel, Switzerland --.

Column 60, lines 5 and 15 in left-hand portion of both formulae, insert

--

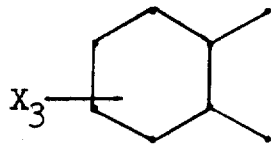

--;

after the formulae, and before line 19, insert

-- in which --.

Signed and sealed this 2nd day of July 1974.

(SEAL)
Attest:

EDWARD M. FLETCHER, JR.            C. MARSHALL DANN
Attesting Officer                  Commissioner of Patents